US008941455B2

(12) United States Patent
Alexander et al.

(10) Patent No.: US 8,941,455 B2
(45) Date of Patent: Jan. 27, 2015

(54) OBJECT RETENTION ON INTERIOR VEHICULAR COMPONENTS UTILIZING CODED MAGNETS

(71) Applicant: GM Global Technology Operations LLC, Detroit, MI (US)

(72) Inventors: Paul W. Alexander, Ypsilanti, MI (US); Paul E. Krajewski, Troy, MI (US); Roy J. Mathieu, Rochester Hills, MI (US); Anthony L. Smith, Troy, MI (US); Nancy L. Johnson, Northville, MI (US); Thomas Wolfgang Nehl, Shelby Township, MI (US); Mark A. Voss, Richmond, MI (US); Kevin Krenn, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 12 days.

(21) Appl. No.: 13/770,296

(22) Filed: Feb. 19, 2013

(65) Prior Publication Data

US 2014/0232500 A1   Aug. 21, 2014

(51) Int. Cl.
H01F 7/02    (2006.01)

(52) U.S. Cl.
CPC ................................ *H01F 7/0231* (2013.01)
USPC .............................................. 335/306; 24/303

(58) Field of Classification Search
CPC ... H01F 7/0242; H01F 7/0284; H01F 13/003; H01F 7/02; H01F 7/0231; H01F 7/0252
USPC ........... 335/285, 302–306; 24/303; 248/309.4
See application file for complete search history.

(56) References Cited

U.S. PATENT DOCUMENTS

| | | | | |
|---|---|---|---|---|
| 3,474,366 | A * | 10/1969 | Barney | 335/206 |
| 4,523,083 | A * | 6/1985 | Hamilton | 219/433 |
| 6,892,428 | B2 * | 5/2005 | Reiter | 24/303 |
| 7,066,778 | B2 * | 6/2006 | Kretzschmar | 446/92 |
| 2011/0018665 | A1 * | 1/2011 | Fullerton et al. | 335/306 |
| 2012/0146752 | A1 * | 6/2012 | Fullerton et al. | 335/306 |
| 2012/0286912 | A1 * | 11/2012 | Fullerton et al. | 335/306 |

* cited by examiner

*Primary Examiner* — Bernard Rojas
(74) *Attorney, Agent, or Firm* — Dierker & Associates, P.C.

(57) ABSTRACT

A method of and attachment system for securing and manipulating attractive objects upon an interior vehicular surface, utilizing at least one coded magnet to selectively attach/retain the objects, and provide various other functions, including aiding in alignment, orientation, and retrieval of the objects, and activating an associated sub-system.

20 Claims, 3 Drawing Sheets

OBJECT RETENTION ON INTERIOR VEHICULAR COMPONENTS UTILIZING CODED MAGNETS

BACKGROUND

In the automotive art, a plurality of fixed and retractable mechanisms, ports, etc. is typically provided at locations within reach of the driver/passenger for securing various objects, such as keys, portable phones, PDA's, electronic devices, pens, and cups. Though they may remain free to jostle, such objects are typically confined to a space through physical engagement with lateral walls and/or covers. However, these solutions may in some instances present obscuring configurations that reduce the user's access to the objects. Reconfigurable mechanisms, such as adjustable straps, have been developed that enable objects of differing dimension and/or shape to be secured while being accessible; however, these measures are typically compatible with objects of limited geometric variance, and in many cases require extensive manual adjustment prior to securing a different object. Further attachment means have been developed, such as hook and loop fasteners, which more securely retain the object and provide access; but they often require unsightly strips to be adhered to the surface, and offer no additional functionality. Lastly, it is appreciated that in each of these solutions tolerances are achieved manually, and the tighter the tolerance for securing the object, the more dexterity is required.

SUMMARY

An interior vehicle attachment system is adapted to selectively secure an object relative to a surface, such that the object achieves a retained condition. The system includes an interior vehicular component accessible to an occupant, defining the surface, and includes a fixed coded magnet further including a fixed plurality of maxels having individual polarities and strengths, and cooperatively emitting a magnetic field profile from the surface. The coded magnet and object are cooperatively configured to exert a predetermined force upon the object, when the object is brought to a first distance from the coded magnet.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
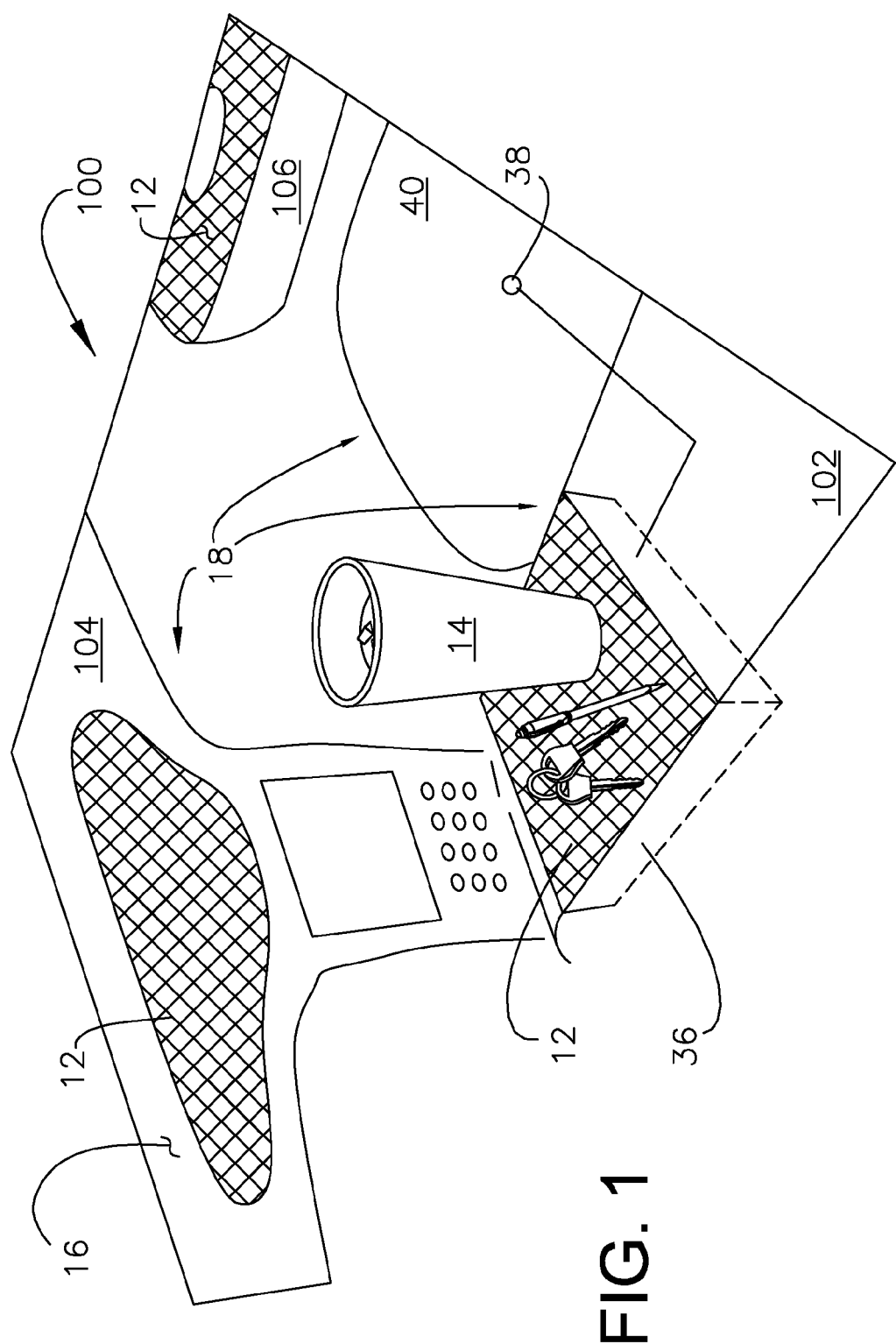
FIG. 1 is a perspective view of an interior cabin of a vehicle including an attachment system incorporated by various components including an armrest, dashboard, and center console, and including a sensor, controller, and plural coded magnets, in accordance with an example of the present disclosure, and further illustrating a plurality of attractive objects securely attached to a surface defined by the center console.

The present disclosure generally relates to interior vehicular components/surfaces and methods of securing objects thereupon, and more particularly, to interior vehicular components that utilize coded magnets to fix attractive objects to a surface and expand component functionality.

In response to the above-mentioned concerns, examples of the present disclosure recite an interior vehicular attachment system that utilizes a coded magnet to secure an attractive object upon an interior vehicular surface. As such, the present disclosure is useful for more securely fixing objects within the interior cabin of a vehicle, so as to remove all degrees of freedom and eliminate unwarranted motion during operation of the vehicle. In addition to removable retention capabilities, the system of the present disclosure offers added functionality and improvement over the prior art, including for example, the ability to autonomously align and orient the object during placement, retain the object without physically contacting a surface (i.e., through "hovering"), detect the presence of the object/offer other feedback, and selectively repel or eject the object to aid in retrieval. Moreover, the present disclosure is useful for identifying and selectively securing an object, while allowing other non-attractive objects to use the surface conventionally. Thus, the present disclosure is useful for providing a more dynamic and robust method of securing any object onto an interior surface of a vehicle; and as such, may be used to improve the functionality of a wide range of conventional vehicular components including arm rests, dashboards, and center consoles, as well as aid in the reconfigurable permanent construction of these components.

In summary, the present disclosure concerns an interior vehicle attachment system adapted to selectively secure an object relative to a surface. The system includes an interior vehicular component accessible to an occupant, defining the surface, and including a fixed coded magnet further including a fixed plurality of maxels having individual polarities and strengths. The maxels cooperatively emit a magnetic field profile from the surface. The coded magnet and object are cooperatively configured to exert a predetermined force upon the object, when the object is brought a first distance from the surface.

As shown in FIGS. 1-4a, an example of the present disclosure concerns an attachment system 10 adapted for use within the interior cabin of a vehicle (e.g., automobile, airplane, boat, etc.) 100, which features a coded magnet 12 to, among other things, effect selective, tailored, and/or reversible attachment of one or more attractive objects 14. The present disclosure may be applied to any surface 16 defined by an interior component 18 of the vehicle 100, such as an armrest, dashboard, or center console, and may be used to enable temporary attachment of movable objects 14, or for facilitating permanent construction of the components 18 themselves.

More particularly, the system 10 may be used to provide fixed attachment of objects 14, such as keys, portable phones, PDA's, digital maps/GPS receivers, electronic devices, pens, clip boards, and cups, upon any surface 16, while maintaining the access and aesthetics offered by an exposed surface. In examples of the present disclosure, the system 10 is further configured to aid in alignment, attachment and/or retrieval of the object 14. The present disclosure may be used to aid and facilitate the construction of many interior vehicle components, such as seats, and driver controls (e.g., steering wheels, turn signal stalks, shifters, gauges, dials, touch screens, etc.) by providing forces directed towards one-way attachment between the component 18 and vehicular base structure (not shown), or between the "skin" or exterior cover of the component itself. Plural configurations, functions, and applications of the system 10, including those involving a peripheral sub-system 20, are contemplated and described below, with the understanding that those of ordinary skill in the art may discern other examples without deviating from the present disclosure.

As used herein, the term "coded magnet" shall be afforded its ordinary meaning, and include any magnetic assembly including a plurality of discrete individual magnets, known as "maxels," that cooperatively produce a magnetic field profile. The overall magnetic field of the coded magnet depends on the arrangement of the constituent magnetic elements. That is to say, by properly positioning maxels on a coded magnet surface, a force curve having particular attractive and/or repulsive strengths at certain distances may be created. Since the maxel pattern of a coded magnet varies in two dimensions, rotational realignment of the engaged external magnetic surface, including a correlated magnet may relatively easily disengage the coded magnet from the external magnetic surface. As further described herein, coded magnets may be formed using permanent or electromagnet maxels.

In FIG. 1, the interior cabin of a vehicle 100 is shown including an example of the attachment system 10 incorporated within various components 18, including the center console 102, dashboard 104, and armrest 106. A plurality of objects (e.g., a cell phone, pen, and cup partially filled with fluid) 14 is shown attached to the top surface 16 of the center console 102. The coded magnet 12 may define, or lie just beneath the surface 16, and may extend along an entire surface 16 or define only a docking portion thereof. That is to say, the component 18 may further include a cover 22 overlaying and protecting the coded magnet 12 and other innerworkings of the system 10. For example, an impervious cover 22 may be used to protect the coded magnet 12 from fluid spills where particularly adapted to engage a cup; or a thermally insulative cover 22 may be used to protect the magnet 12 from heat.

Figure 2:
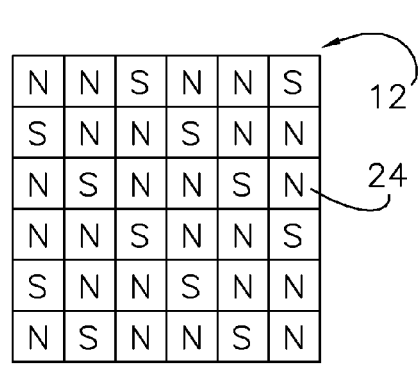
FIG. 2 is a plan view of a coded magnet, particularly illustrating an exemplary set of maxels and polarity pattern.
Figure 2A:
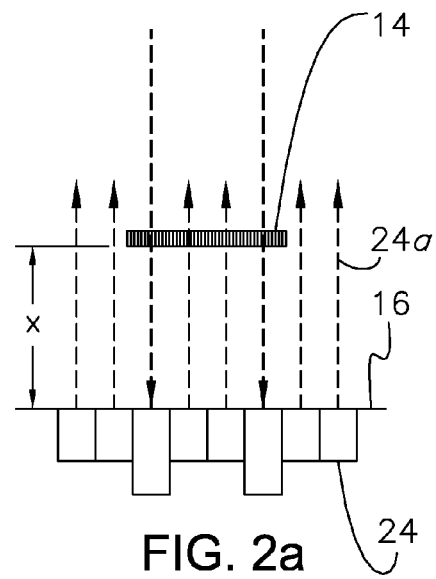
FIG. 2a is an elevation of a coded magnet formed by a plurality of maxels, each defining individual magnetic fields, and an object hovering at an equilibrium distance from the surface, in accordance with an example of the present disclosure.
Figure 3:
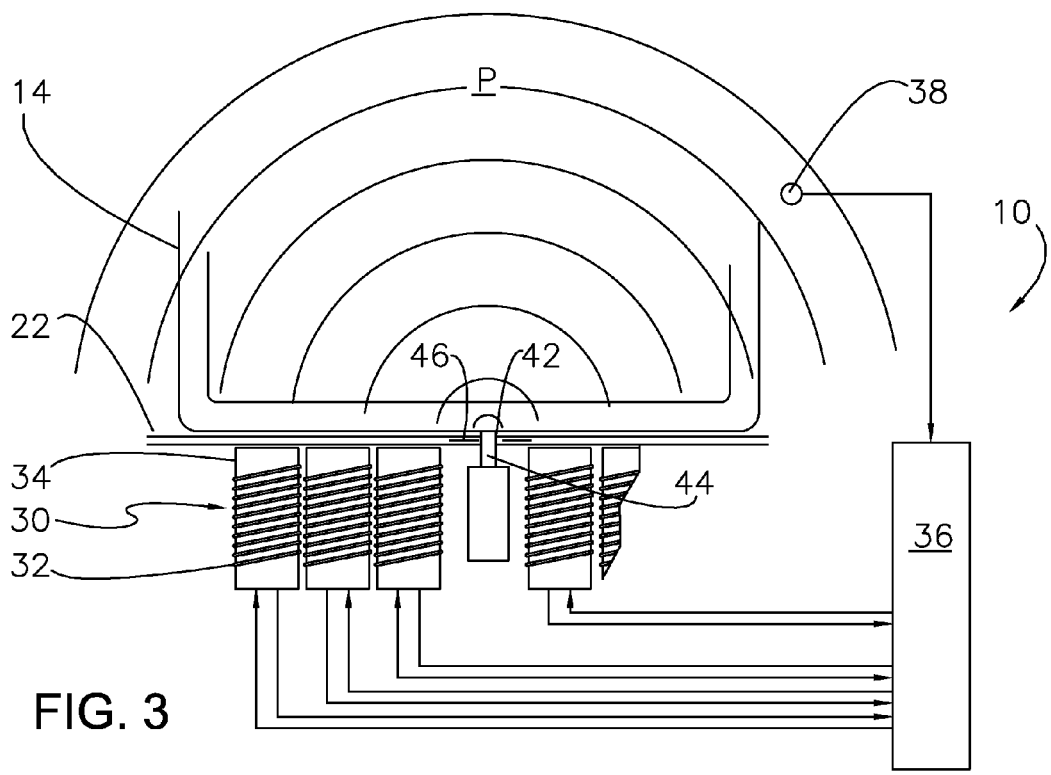
FIG. 3 is an elevation of a coded magnet formed by a plurality of electromagnetic maxels cooperatively emanating a magnetic field, a sensor, and a controller communicatively coupled to the sensor and maxels.

As previously presented, the coded magnet 12 includes a fixed plurality of maxels 24 having individual polarities and strengths (FIGS. 2 and 2a). The maxels 24 are oriented and positioned relative one another, so as to cooperatively emanate a magnetic field profile, P, from the surface 16 (FIG. 3). That is to say, the individual magnetic fields 24a produced by the maxels 24 combine to present an overall magnetic influence upon a ferrous or magnetic (i.e., "attractive") object 14. The maxels 24 may present a rectangular (FIG. 2), circular, polygonal, or any other desired cross-sectional shape.

In FIGS. 2 and 2a, for example, the maxels 24 may include a first subset of maxels having North polarities of a first strength so as to attract a ferrous object (e.g., a coin) 14, and a second subset of maxels 24 having south polarities of a second strength, which repels the same object 14. The first strength may be greater than the second, such that the object 14 experiences a net attractive force at all distances from the object 14 greater than x within the combined magnetic field. Once within x units, the stronger repulsive force becomes greater than the accumulative first strength and gravity (as illustrated) combined, and as a result, pushes the object 14 away from the magnet 12. At x, the forces equilibrate to cause the object 14 to float or hover above the magnet 12. Thus, a ferrous/magnetic coin 14, for example, need only be placed within the vicinity of the magnet 12, which would then funnel it inward until reaching an equilibrium state spaced from the surface 16. Consistent therewith, it is appreciated that wirelessly communicating suspended/floating vehicle controls, such as windshield wiper control stalks, IP knobs, instrument clusters, etc., may be presented within the vehicle interior. For example, a radio or temperature control may be caused to hover central to the passengers, so as to facilitate its retrieval, use, and return. Alternatively, the profile may be configured to repel the object 14 until reaching a distance x, and then attract it from there, so as to protect the docking surface 16 from unwarranted placement. In yet another alternative, the polarities and strengths of the maxels 24 may be cooperatively configured to toggle between attraction and repulsion at multiple distances from the surface 16 to effect a desired behavior.

The maxels 24 may be formed by permanent magnets that are fixed to have their desired poles adjacent the surface 16. More preferably, the maxels 24 are modifiable, so as to change their polarities and/or strengths. Where permanent magnets are employed, for example, the maxels 24 are preferably pivotal or removable, such that the polarity may be changed by pivoting the maxel 24 180 degrees, or by manually removing, turning, and replacing the maxel 24. It is also appreciated that axially translating a maxel 24 towards or away from the surface 16 will further modify the strength of the individual field 24a and therefore profile.

In an example, the system 10 further includes and the object 14 defines or is attached to a second magnet 26. The preferred second magnet 26 is removably attachable (e.g., adhered, magnetically attached, press-fitted, etc.) to a plurality of items (not shown), including the object 14. The fixed coded magnet 12 and second magnet 26 cooperatively exert the predetermined force upon the object 14, when the second magnet 26 is brought a distance, x, from the surface 16. The predetermined force is determined based on the function, size and weight of the object 14, and anticipatory loads to be encountered. More preferably, the second magnet 26 is a second coded magnet correlated with the fixed coded magnet 12 and including a second set of maxels 28. In this configuration, the magnets 12,26 exert the predetermined force, only when the second coded magnet 26 further presents a predetermined orientation relative to the fixed coded magnet 12, such that the first and second set of maxels 24,28 are aligned. More preferably, the second plurality of maxels 28 present polarities that mirror the polarities of the fixed plurality of maxels 24, so as to maximize the attractive forces therebetween. This results in dual alignments where symmetrical maxel patterns exist (e.g., FIG. 2), and singular alignment availability where asymmetrical.

In the example shown in FIG. 3, at least a portion of the maxels 24 is defined by individual electromagnets 30, such that the system 10 further includes an electrical power source (not shown), e.g., the charging system of the vehicle 100 communicatively coupled thereto. As such, in this configuration, each maxel 24 presents reversible and null polarities and an adjustable strength proportional to the amount of current being delivered and the number of coils 32 wrapped about the core 34, which may or may not be the same for each electromagnet 30. It is appreciated that the direction of the current determines the polarity of the electromagnet 30, and therefore whether the maxel 24 attracts or repels the second magnet 26 and object 14. It is also appreciated that electromagnetic maxels 24 may be reprogrammed to complement differing codes as needed. In this regard, the system 10 is configured to autonomously determine the object's code, through detection and analysis of the magnetic profile of the second coded magnet 26, and then match the code by modifying the fixed coded magnet 12.

More preferably, each fixed maxel 24 is formed by a ferromagnetic electromagnet 30 (FIG. 3), wherein the core 34 presents a permanent magnet itself, so as to maintain a base magnetic field profile when no current is provided. Preferably, the electromagnets 30 are individually controlled by a controller 36 operable to modify the current level and direction of current, as is readily determinable by those of ordinary skill in the art. The controller 36 may be programmably configured to activate the electromagnets 30 in response to an action by the user. For example, the controller 36 may be in further communication with the vehicle bus, and configured to determine when the vehicle's door locks have been deployed, or engine started, and activate the electromagnets 30 in response to both or either. The electromagnets 30 may be timed out after a predetermined period, if the placement of an object 14 has not been detected.

Where electromagnets 30 and a controller 36 are employed, the preferred system 10 further includes a sensor 38 operable to detect a condition, and communicatively coupled to at least a portion of the maxels 24 through the controller 36. In this configuration, the sensor 38, controller 36, and fixed coded magnet 12 are cooperatively configured to modify the polarities and/or strength of the maxels 24 upon detection of the condition, e.g., may be used to turn on the magnet 12 when conditions suggest use. For example, a load sensor 38 may be used to detect the presence of a user sitting within a seat 40, and cooperate with the controller 36 to activate the fixed coded magnet 12 for only the components proximate the seat 40 (FIG. 1). In another example, because the coded magnet 12 may be reprogrammed in real-time, it is appreciated that the force (magnetic field strengths) exerted on the object 14 may be increased when maneuvering sharp curves or corners, as determined through yaw rate or steering wheel sensors and/or a GPS tracking.

In other examples, the object 14 and component 18 may be cooperatively configured to effect non-contact retention with input/feedback capabilities. For example, a radio knob correlatively coded to hover above the face of a radio, may be configured to maintain its position when rotated a certain amount (e.g., a repeated, coded pattern every 15 degrees of rotation to give it multiple rotational steps); the coded patterns are cooperatively configured, however, such that a difference in the combined field at every step is detectable by the sensor 38, which delivers the feedback to the controller 36 to adjust the volume, etc. In another example, a floating windshield wiper control arm may present 3 or 4 permanent positions (e.g., within a sliding slot), and be configured to sense and communicate to the controller 36 its position, so as to cause a desired change to the wiper setting.

In addition to secure attachment, the preferred system 10 offers supplemental functionality. For example, where the object 14 is an electronic device, the fixed coded magnet 12 may be configured to activate and/or charge the device. To that end, the fixed coded magnet 12 may define a port 42 for receiving a lead 44 composing the device (FIG. 3). The magnet 12 and device 14 may be cooperatively configured such that only when the attractive force is strongest, i.e., a properly oriented correlated magnet 26 is brought to the predetermine distance within the magnetic field profile, does the port 42 become accessible. Here, the sensor 38 may be a magnetic sensor operable to determine the identifiable change in magnetic field upon such occurrence; and the controller 36 is configured to activate an electromagnet 30 disposed beneath the port 42, so as to extract the lead 44 recessed within the device 14. An iris 46 that selectively covers the port 42 may be further caused to open under the magnetic influence. Alternatively physical engagement between exposed electrical contacts attached to and communicating with the device 14 and vehicle power source may result from forced translation of at least one maxel 24 or other structure, when the device 14 is fully docked. In a floating/hovering example, the device 14 and component 18 may be correlatively configured to present a wireless charge pad having retention and orientation properties, for example, by creating an alternating magnetic field atop the retention field, which inductively charges the device.

Figure 4A:
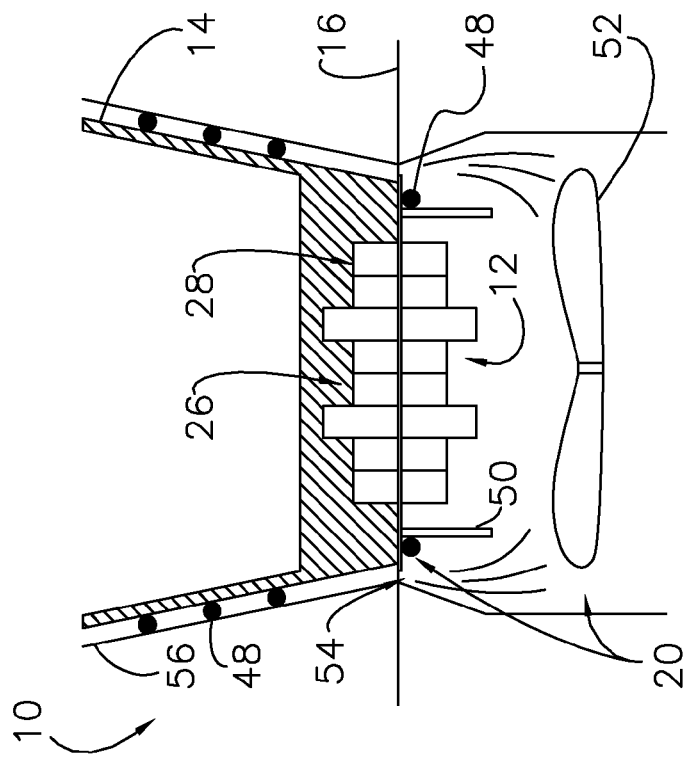
FIG. 4a is an elevation of the system shown in FIG. 4.
Figure 4:
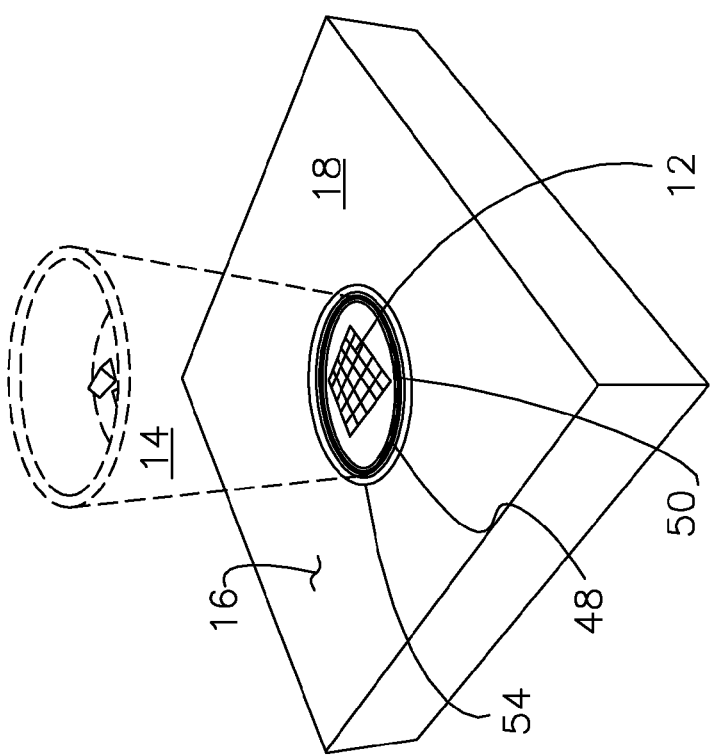
FIG. 4 is a perspective view of an attachment system including a coded magnet, wherein a heating/cooling subsystem is communicatively coupled to and actuated by the coded magnet, in accordance with an example of the present disclosure.

In FIGS. 4 and 4a, an example of system 10 is communicatively coupled and configured to activate a peripheral sub-system 20, when the object 14 and/or second magnet 26 is brought to the predetermined distance from the surface 16. In the illustrated example, it is appreciated that the distance may be zero; that is to say, the sub-system 20 is actuated only when the object 14 has been fully and properly docked upon the surface 16. However, it is certainly within the ambit of the present disclosure to actuate the sub-system 20 prior to placing the object 14, for example, by detecting a change in the magnetic field profile or through use of a proximity or motion sensors. The sub-system 20 produces a desired output when actuated, and may be activated by modifying a circuit composing the sub-system 20, or detecting the object 14 when brought to the predetermined distance from the surface 16.

For example, and as shown in FIGS. 4 and 4a, where the object 14 is a cup including a second coded magnet 26 attached at its base, and correlated to a fixed coded magnet 12 engaged with a surface 16, the sub-system 20 may be a heating/cooling system operable to heat and/or cool a fluid (e.g., coffee) contained within the cup 14. In this configuration, the sub-system 20 may include a resistive heating element 48 disposed preferably adjacent the surface 16, and circumscribing the magnet 12 but within the lowermost radius of the cup 14. The magnet 12, cup 14 and heating element 48 are cooperatively configured to heat the fluid through conduction. The sub-system 20 preferably includes a lateral thermal barrier 50 intermediate the heating element 48 and fixed coded magnet 12, so as to promote magnetic function. Once a properly aligned second coded magnet 26 is detected or caused to fully engage the fixed magnet 12, an electric current is caused to flow through the heating element 48 by closing a circuit (not shown).

More preferably, the heating/cooling sub-system 20 is further configured to cool the fluid as well. To that end, the sub-system 20 may further include a circulating fan 52 disposed beneath the fixed coded magnet 12 (FIGS. 4 and 4a) and operable to produce a low-pressure curtain of airflow against the cup 14. Like the heating element 48, the fan 52 is communicatively coupled to the fixed coded magnet 12, and the system 10 is configured such that when the object (e.g., a cup of hot fluid) is brought to a predetermined distance relative to the surface 16, including zero, the fan 52 is autonomously activated. More particularly, full alignment and physical engagement by the cup 14 and surface 16 may be configured to effect activation by manipulation of a magnetic switch; or sensory detection of the cup 14 while being placed may provide input to a controller 36 that activates the fan 52. A discontinuous vent or slit 54 is defined by the surface 16 radially exterior to the heating element 48, so as to direct the airflow towards the cup 14. More preferably, the vent 54 is tapered towards the surface 16 (FIG. 4a) so as to funnel the airflow, thereby increasing its speed prior to exit. The cup 14 and fluid disposed therein are cooled through convection. It is appreciated that providing an exterior source of airflow to the fan 52 will further accelerate cooling in certain climates and seasons, and that a combination of heating and cooling may be used to maintain a constant fluid temperature given the necessary feedback.

In an example, the heating element 48 and fan 52 are alternatively activated by introduction of separate and distinct second coded magnets 26 attached to hot and cold fluid cups, respectively. By identifying their own preauthorized magnetic field profiles or the differing magnetic influence these individual magnets will have on the fixed coded magnet profile, the controller 36 will be able to determine whether to heat or cool the cup 14, e.g., actuate the fan 52 or element 48. Alternatively, of course, separate heating and cooling stations may be defined by the surface 16, and their fixed magnets 12 configured to repel the respected second coded magnets of the other cup to prevent misplacement (or allow placement of the non-correlated magnet but prevent activation).

In another example, the cup 14 and second magnet 26 may be disposed within a receptacle having the fixed coded magnet 12 at its base, wherein the walls of the receptacle act as a fixed physical guide 56 for the object 14 (FIG. 4*a*). That is to say, a guide 56 may be configured and positioned to physically engage the object 14 in at least one direction, so as to reduce, and more preferably, eliminate motion in that direction; and in the illustrated example, the walls of the receptacle limit the lateral motion of the cup 14. As a result, it is appreciated that the retention and alignment demands upon the system 10 and therefore complexity of the coded magnet patterns are reduced. The walls of the receptacle may also include multiple resistive heating elements 48, so as to further function to engage and conductively heat the cup 14 along the inserted depth. Thus, in this configuration, a simpler fixed magnet 12 need only orient the cup 14 (e.g., align the heating elements 48 and a thermally conductive section of the cup 14) and/or activate the sub-system 20.

Finally, it is also appreciated that the preferred peripheral sub-system 20 may be further configured to activate, only when the object 14 and/or second magnet 26 is brought to the predetermined distance from the surface 16 and a command is received from a user/second sub-system. In this regard, it is appreciated that the controller 36 is communicatively coupled to the user or second sub-system via an input device or sensor (not shown). For example, the cup 14 may be caused to eject from a holder, only when docking is detected and a user produces an input, e.g., performs an action, such as pressing a button, turning the engine off, deploying a door lock, etc., that is detected by or delivered to the controller 36.

In another aspect of the present disclosure, the system 10 may be used to aid and facilitate the construction of the interior vehicular components 18, such as driver controls (seats, armrests, center consoles, instrument panels, steering wheels, turn signal stalks, shifters, gauges, dials, touch screens, etc.) by providing forces directed towards one-way attachment between the component 18 and vehicular base structure (not shown), or between the "skin" or exterior cover of the component 18 itself. That is to say, it is appreciated that using the alignment and orienting capabilities of correlated magnets will facilitate the proper manual placement of components. Further, once attached, disassembly and reconfiguration are aided simply by twisting the component 18 90 degrees (where symmetrical patterns are employed), so as to misalign the magnets 12,26, or where electromagnets are used, by reversing the current flow, to repel the component 18 from the base structure.

As used herein, the terms "first", "second", and the like do not denote any order or importance, but rather are used to distinguish one element from another.

In describing and claiming the examples disclosed herein, the singular forms "a", "an", and "the" include plural referents unless the context clearly dictates otherwise. Furthermore, when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

The invention claimed is:

1. An interior vehicle attachment system adapted to selectively secure an object relative to a surface, such that the object achieves a retained condition, the system comprising:
an interior vehicular component accessible to an occupant, defining the surface, and including a fixed coded magnet having a fixed plurality of maxels having individual polarities and strengths, and cooperatively emitting a magnetic field profile from the surface; and
a guide configured and positioned to physically engage the object, so as to reduce or eliminate motion by the object in at least one direction;
wherein:
the coded magnet and object are cooperatively configured to exert a predetermined force upon the object when the object is brought to a first distance from the coded magnet; and
the guide and fixed coded magnet are cooperatively configured to hold the object in the retained condition.

2. The system as defined in claim 1 wherein the object includes a ferrous material, and the coded magnet exerts the predetermined force upon the object when the ferrous material is brought the first distance from the coded magnet.

3. The system as defined in claim 1 wherein the object includes a second magnet, and the magnets cooperatively exert the predetermined force upon the object when the second magnet is brought the first distance from the coded magnet.

4. The system as defined in claim 3 wherein the second magnet is removably attached to the object, and transferable between a plurality of items including the object.

5. The system as defined in claim 3 wherein the second magnet is a second coded magnet correlated with the fixed coded magnet, and the magnets cooperatively exert the predetermined force upon the object when the second coded magnet further presents a predetermined orientation relative to the fixed coded magnet.

6. The system as defined in claim 5 wherein the second magnet comprises a second plurality of maxels presenting polarities mirroring the polarities of the fixed plurality of maxels.

7. The system as defined in claim 1 wherein the coded magnet defines at least a portion of the surface.

8. The system as defined in claim 1 wherein the component further includes a protective cover overlaying the coded magnet, such that the coded magnet is beneath the surface.

9. The system as defined in claim 1 wherein the fixed coded magnet is adjustably configured, and operable to modify the profile.

10. The system as defined in claim 9 wherein at least a portion of the maxels is translatable.

11. The system as defined in claim 9 wherein at least a portion of the maxels is defined by individual electromagnets, such that each of the at least portion of the maxels presents reversible and null polarities and adjustable strength.

12. The system as defined in claim 9, further comprising:
a sensor operable to detect a condition, and communicatively coupled to at least a portion of the maxels;
wherein the sensor and fixed coded magnet are cooperatively configured to modify any of the polarities or strength of the at least portion of the maxels upon detection of the condition.

13. The system as defined in claim 1 wherein the object is an electronic device, and the fixed coded magnet and object are cooperatively configured to enable the electronic device to activate in response to the electronic device being brought to the first distance from the surface and an input from a user or an other electronic device.

14. The system as defined in claim 1, further comprising:
a sub-system communicatively coupled to the fixed coded magnet and operable to produce an output;
wherein the sub-system and fixed coded magnet are cooperatively configured to produce the output when the object is brought to the first distance from the surface.

15. The system as defined in claim 14 wherein the sub-system comprises a circuit, and the fixed coded magnet and object are cooperatively configured to physically modify the circuit and produce the output when the object is brought to the first distance from the surface.

16. The system as defined in claim 14, further comprising:
a magnetic sensor operable to detect the object when brought to the first distance from the surface, and communicatively coupled to the sub-system;
wherein the sensor and sub-system are cooperatively configured to produce the output when the object is detected.

17. The system as defined in claim 14 wherein the object is a cup, and the sub-system is a heating/cooling system operable to any of heat or cool a fluid contained within the cup.

18. The system as defined in claim 17 wherein the sub-system includes a heating element disposed beneath the surface, and further includes a thermal barrier intermediate the heating element and fixed coded magnet.

19. The system as defined in claim 1 wherein the force is repulsive, the distance is greater than zero, and the profile and object are cooperatively configured such that the object is caused to hover above the coded magnet when brought to the first distance from the surface.

20. An interior vehicle attachment system adapted to selectively secure an object relative to a surface, such that the object achieves a retained condition, the system comprising:
an interior vehicular component accessible to an occupant, defining the surface, and including a fixed coded magnet having a fixed plurality of maxels having individual polarities and strengths, and cooperatively emitting a magnetic field profile from the surface;
wherein:
the coded magnet and object are cooperatively configured to exert a predetermined repulsive force upon the object when the object is brought to a first distance greater than zero from the fixed coded magnet; and
the profile and object are cooperatively configured such that the object is caused to hover above the fixed coded magnet when brought to the first distance from the surface.

* * * * *